United States Patent [19]

Galloway et al.

[11] Patent Number: 4,863,702

[45] Date of Patent: Sep. 5, 1989

[54] AUTOCLAVE FOR HAZARDOUS WASTE

[75] Inventors: Terry R. Galloway, Berkeley; Thomas J. Green, San Leandro; Dennis M. Criswell, San Leandro, all of Calif.

[73] Assignee: Thermolytica Corporation, Hercules, Calif.

[21] Appl. No.: 92,041

[22] Filed: Sep. 1, 1987

[51] Int. Cl.⁴ .......................... B01J 1/00; F28D 21/00; F23B 5/02

[52] U.S. Cl. ..................................... 422/189; 422/203; 422/204; 422/235; 422/234; 422/173; 422/111; 110/204; 110/257

[58] Field of Search ............... 422/203, 204, 235, 234, 422/193, 189, 111, 78, 80; 110/204, 257, 224

[56] References Cited

U.S. PATENT DOCUMENTS

| | | | |
|---|---|---|---|
| 2,148,447 | 2/1939 | Dundas et al. | 110/224 |
| 3,791,316 | 2/1974 | Sigg | 110/257 |
| 4,098,200 | 7/1978 | Danvergne | 110/204 |
| 4,400,369 | 8/1983 | Palm | 422/203 |
| 4,640,681 | 2/1987 | Steinbiss et al. | 432/106 |

Primary Examiner—Barry S. Richman
Assistant Examiner—Lyle Alfandary-Alexander
Attorney, Agent, or Firm—Fitch, Even, Tabin & Flannery

[57] ABSTRACT

A process for preparing a feed gas, for a thermolytic detoxification reactor or other processing units, utilizing an autoclave is described. A container of liquid waste is placed in an inerted and atmospherically sealed enclosure and hot gaseous effluent from the reactor is introduced to the interior of the enclosure outside the container to heat the liquid waste. The hot gaseous effluent is recirculated from the enclosure to the interior of the container to mix with the gaseous contents thereof. Gas is conducted from the interior of the container to the reactor as feed gas. The autoclave can also be fed by a pumped liquid waste stream.

10 Claims, 2 Drawing Sheets

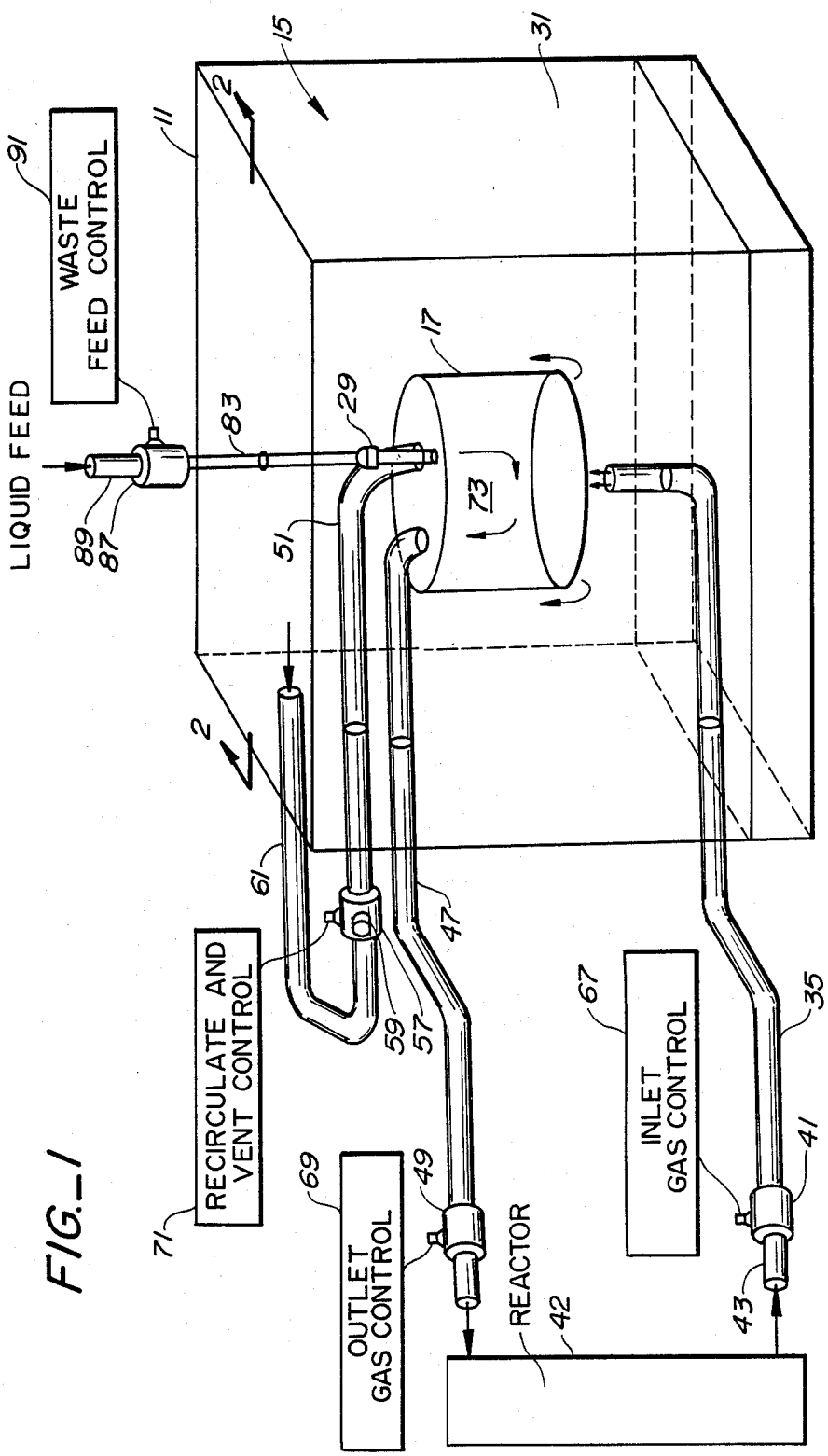
FIG_1

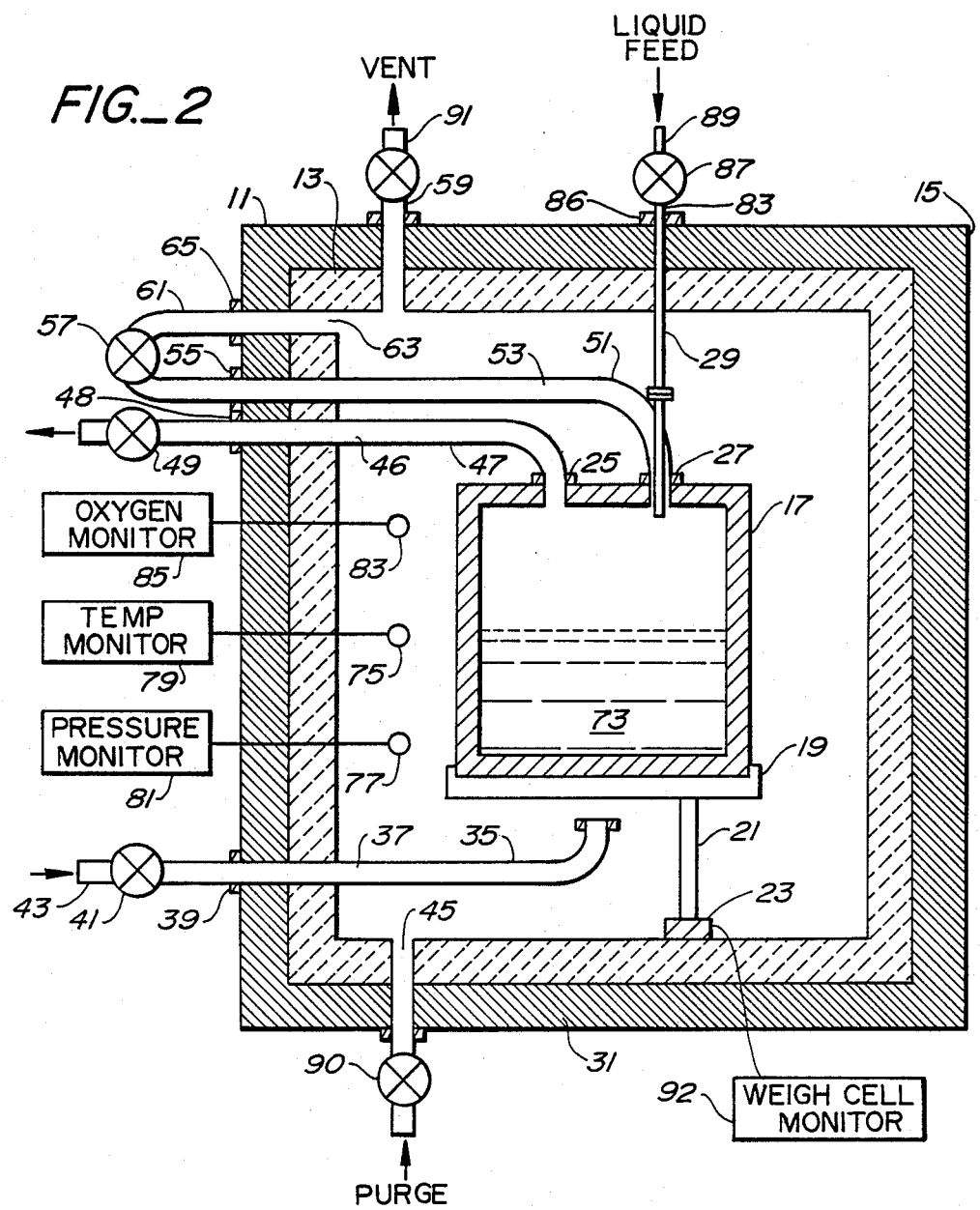

AUTOCLAVE FOR HAZARDOUS WASTE

This invention relates to the detoxification of hazardous waste. More particularly, the invention relates to the preparation of feed gas for a thermolytic detoxification reactor by vaporizing and gasifying toxic waste in an autoclave.

The detoxification of hazardous waste to very low levels has been conducted using incinerators. Incinerators, however, are often difficult to control and consume substantial energy. Moreover, the incineration process may produce other toxic products which are themselves undesirable and which are difficult or impossible to eliminate.

In co-pending U.S. patent application Ser. No. 903,235, now abandoned, a process and apparatus are described for toxic waste detoxification which represents a significant improvement over incinerators. In the aforesaid application, a reactor is described in which destruction levels of 99.99% or more are achieved with wastes in solid, liquid, or gaseous form. The aforesaid process and apparatus are operated without air or oxygen reaction and produce an effluent gas which is primarily comprised of carbon dioxide and water. The process and apparatus described in the aforesaid patent application has been classified by the United States Environmental Protection Agency as "thermolytic detoxification" as differentiated from "incineration".

A common way of handling liquid toxic waste is to seal the liquid in a metal drum for transport to a disposal facility. Since a thermolytic detoxification reactor typically requires a gaseous feed, it becomes necessary in the case of liquid toxic waste in metal drums to provide for vaporization of the contents of the drum. Heretofore, schemes for handling metal drums containing toxic waste have been unsatisfactory for a variety of reasons. For example, whole drums of liquid waste are neither acceptable to landfills nor as direct feed to incinerators. Converting liquids to solids or repacking to small incinerable fiber containers is expensive and occupationally and environmentally risky. And residue of the contents of the drums will remain after processing, requiring further cleanup and disposal operations. Uncontained vaporization of drummed liquids is being illegally practiced in the United States and worldwide with vapors contaminating the environment and surrounding equipment, thus seriously restricting subsequent handling of such equipment.

Accordingly, it is an object of the present invention to provide an improved method and apparatus for producing an inlet feed gas for a thermolytic detoxification reactor.

Another object of the invention is to provide an improved process and means for detoxifying liquid toxic waste contained in metal drums by conversion to a harmless solid with no handling.

Another object of the invention is to provide an improved and efficient system for continuously feeding from large tanks toxic waste to a thermolytic detoxification reactor These and other objects of the invention will become apparent to those skilled in the art from the following description, taken in connection with the accompanying drawings wherein:

FIG. 1 is a schematic perspective view illustrating apparatus constructed in accordance with the invention; and FIG. 2 is a sectional view taken along a vertical plane through the line 2—2 of FIG. 1 with additional elements shown.

Very generally, the invention relates to a process for preparing feed gas for a thermolytic detoxification reactor using an autoclave as the feed source. The autoclave comprises an enclosure for enclosing a toxic waste container in an inerted and atmospherically isolated volume. Hot gaseous effluent from the reactor is introduced to the interior of the autoclave enclosure at the outside bottom of the container to heat liquid waste contained therein. The hot gaseous effluent from the enclosure is recirculated to the interior of the container to mix with the gaseous contents of the container. Gas is then conducted from the interior of the container to the reactor as the feed gas.

Referring now both to FIGS. 1 and 2, a more detailed description of the invention will be given. In the drawings, the autoclave is illustrated as a box 11 having rectangular sides. The box 11 may be constructed of suitable metal plate material as shown in FIG. 2. Preferably the interior of the box is provided with a liner of a suitable thermal insulating material, such as the illustrated panels 13 of insulation covered by expanded metal. A door 15, also insulated with a panel, is provided in the enclosure 11 suitably mounted with hinges and latches (not shown) for permitting insertion and removal of a toxic waste container 17, typically a drum, as described below.

The toxic waste container 17 may be supported inside the enclosure 11 by any suitable means. In the illustrated embodiment, (FIG. 2) the container 17 is shown supported on a metal support plate 19. The metal support plate 19 is in turn supported by suitable means, and is also connected via a rod 21 to a scale 23 for monitoring the weight of the contents of the container 17.

The container 17 may be any suitable container for containing liquid toxic waste. Typically, in the U.S.A., these are steel 55 gallon drums well known in the art. For reasons which will become more fully apparent, the top of the container 17 is provided with two fittings 25 and 27. Two fittings 25 and 27 are threaded into top lid openings for communicating with the interior of the container 17, and may be provided with quick-disconnects, threaded unions or the like for facilitating such connection.

Substantially in the center and toward the bottom of the back of the enclosure 11 is provided a fitting 39 which has a flange or the like for connecting to an inlet feed tube 35. The feed inlet tube 35 for the enclosure 11 extends through an opening 7 in the wall of the enclosure 11, supported in said fitting 39. The tube 35 has a 90° upward turn and terminates immediately below the container 17. An inlet feed valve 41 is provided in the tube 35 outside of the enclosure 11. This inlet valve 41 provides for connecting the conduit 35 to the effluent from the thermolytic decomposition reactor. There is also a purge conduit 45 which is connected to a suitable source of purge gas, not shown, controlled by valve 90 for inlet supply and for exit vent via conduit 59, controlled by valve 91.

At the top of the toxic waste container 17, two conduit connections are made via the fittings 25 and 27, respectively. The fitting 25 connects to one end of a conduit 47 which passes through an opening 46 and fitting 48 supported on the enclosure 11 to an outlet valve 49, and thence to the thermolytic detoxification reactor to provide the inlet feed thereto. The fitting 27 connects to one end of a conduit 51 which extends through an opening 53 and fitting 55 in the wall of the enclosure 11 to a valve 57. The valve 57 may be controlled to provide a return circulation via the conduit 51 to the container 17 from a recirculation conduit 61. The recirculation conduit 61 extends from the valve 57 to an opening 63 in the wall of the enclosure 11 via a fitting 65.

For reasons set forth below, the smaller third inlet fitting 29 on fitting 27 connects one end of a feed conduit 83. The conduit 83 passes upwardly through the inside concentrically of conduit 51 and thence through an opening 85 in the top of the enclosure 11, supported by a fitting 86, to an inlet feed valve 87. The valve 87 is connected to an inlet conduit 89 for connection to a source, not shown, of liquid toxic waste.

Referring particularly to FIG. 1, the valve 41 is controlled by an inlet gas control system 67. The valve 49 is controlled by an outlet gas control system 69. The valve 57 is controlled by a recirculation control system 71. The operation of the control systems 67, 69 and 71 are described with greater particularity below.

In the autoclave of the invention, the hot gases from the thermolytic detoxification reactor, typically in excess of 350° C., are cycled through the valve 41 and conduit 35 to the interior of the enclosure 11 in the space between the insulating wall 13 and the toxic waste container 17. The hot gas emanating from the conduit 35 circulates upwardly inside the enclosure 11, heating the contents of the container 17 to assist in vaporization of the toxic liquid waste therein, indicated generally at 73. The enclosure 11 is sealed against atmosphere.

Referring particularly to FIG. 2, before circulating the effluent from the thermolytic detoxifier reactor into enclosure 11, the enclosure is purged of air via the conduit 45 through the purge inlet by suitably setting valve 90. The purge step may utilize a source of inert gas but preferably employs cool carbon dioxide. The purge step may utilize a source of inert gas but preferably employs carbon dioxide. During the purge cycle, the valves 41, 49 and 57 are closed. The purge gas inlet valve 91 and the vent valve 91 are opened. This insures that all air within the enclosure 11 will be eliminated through appropriate purging.

Once the interior of the enclosure 11 has been purged of air or oxygen, the valve 41 is operated to connect the effluent from the thermolytic detoxification reactor to the conduit 35 to begin heating the contents of the container 17. At the same time the valve 57 is operated to connect the conduit 61 with the recirculation conduit 51. As a result, effluent from the thermolytic detoxification reactor after circulating past the container 17 and warming the contents thereof, is recirculated through the interior of the container 17 itself. The gas thus recirculated mixes with the vaporized contents of the container and is then transported from the interior of the container via the conduit 47 through the valve 49. The valve 49 is opened to begin the feed from the container 17 to the thermolytic detoxification reactor.

The result of the foregoing described configuration permits the liquid waste inside the container 17 to be vaporized directly with the vapors passed directly to the thermolytic detoxification reactor without any additional pumping or handling. This is a particularly important feature for especially hazardous and unpumpable waste. As the liquid in the container 17 vaporizes, any residue is retained in the container 17 as solid waste for later disposal.

During operation, a suitable temperature transducer 75 and a suitable pressure transducer 77 provide signals to a temperature monitor 79 and pressure monitor 81, respectively. An oxygen detector 83 is also provided to sense the oxygen content within the interior of the container 11 and provide signals to an oxygen monitor 85. It is preferred that the autoclave of the invention be operated so that the pressure inside the enclosure 11 is at or just below one atmosphere. Typical temperature of the thermolytic detoxification reactor effluent gases is at approximately 1500° C. These effluent gases are comprised primarily of carbon dioxide and water, the latter being in the form of superheated steam.

The autoclave of the invention, since it provides for easy handling of typical 55 gallon drum containers, is readily adapted to an on-site facility. Moreover, the autoclave provides the ability to handle such containers while at the same time vaporizing and safely conducting to the thermolytic detoxification reactor any leakage in the drum. Since the reactor is operated in an oxygen free atmosphere, the danger of explosion or other combustion of waste is avoided. As previously mentioned, left over residue is easily handled for disposal as solid waste. If desired, the contents of the container 17 may be replenished, either continuously or periodically, via the feed tube 83 and valve 87.

In controlling the thermolytic detoxification reactor effluent to the enclosure 15, the inlet gas control system 67 operates the valve 41 as required. The valve 41 is a continuously variable proportional control valve that adjusts the volumetric flow of the gas entering the enclosure 15 in order to control and regulate the rate of heating of the contents 73 of the container 17. By suitably operating the valve 41, the inlet gas control system 67 controls the rate of vaporization of the volatile components in the hazardous waste 73 and thus controls the flow rate from the container 17 to the thermolytic detoxification reactor. The inlet gas control system 67 (as well as the other control systems) may be of any suitable design. For example, the control systems may include a digital processor into which various operating parameters are fed and which contain a suitable operating program for controlling the associated valve. This valve 41 may also be located at the thermolytic detoxifier instead of at the autoclave and still achieve the same operation.

The information provided by the weigh-scale 23 enables calculation of the vapor production rate to the optimum value for maximum detoxification of toxic components. In addition, where liquid toxic waste is continuously fed into the container 17 to replenish the contents, the weigh-scale 23 provides for control via controller 92 of the feed via the valve 87, to maintain a preestablished weight or weight increase. For liquids which produce significant quantities of solid residue or ash within the container 17, the buildup of solid residue can be determined by momentarily interrupting the liquid feed through the conduit 85 and measuring the weight of the container 17 and its contents.

The autoclave concept applies to a variety of other waste detoxification devices and processes in addition to the thermolytic detoxifier. For example, the autoclave may produce a vapor stream appropriate to solvent reclamation units that will produce reusable solvents and wastes (which the thermolytic detoxifier can process).

The relationship between the processing conditions of the thermolytic detoxification reactor and the autoclave of the invention is an intimate one. Since the autoclave is heated by recovered heat from the thermolytic detoxification reactor, and since gas from the autoclave is fed to the thermolytic detoxification reactor, the temperature of one affects the other and vice versa. At a constant input power to the thermolytic detoxification reactor, the make-up heat required is typically that which would compensate for an approximately 100° C. core temperature drop in the reactor.

The particular mode of operation will affect the heat rate and vapor removal rate from the autoclave. A thermolytic detoxification reactor may be operated in essentially six flow modes, each of which affects the heat rate and vapor removal rate from the autoclave. These six modes are (1) recycle, (2) vented recycle, (3) low sweep process, (4) high sweep process, (5) low flow process, (6) high flow process. During the recycle mode, no gas venting occurs from the reactor system, with the total amount of gas being recycled. This mode is used during start-up or shutdown. As flow rate increases, the mode of operation moves from low sweep process to high process. In all flow modes, cleaned gas is vented and water is added into the thermolytic detoxifier.

There are six autoclave flow modes that affect the heat rate and vapor removal rate relationship to the thermolytic detoxification reactor: (1) isolated and sealed, (2) $CO_2$ purge to atmosphere, (3) $CO_2$ purge to TLD, (4) processing, (5) container vent to autoclave and (6) autoclave vent to TLD. The first mode is with the enclosure 11 sealed and no flow of gas whatever occurring. In such a mode, the autoclave is essentially isolated from the thermolytic detoxification reactor. During $CO_2$ purge to lower the air or oxygen content in the enclosure 11, the contents of the enclosure 11 are vented via the valve 57 and vent tube 59. Accordingly, once again no affect on the heat balance of the thermolytic detoxifier occurs.

Processing can be started by continuing $CO_2$ purging while the autoclave in vented into the thermolytic detoxifier; thus purging it as well. During the various reactor flow modes, described above, the recirculation process occurs and the heat balance is affected in various ways. Upon cooling, the contents of the enclosure 15 may be purged once more with carbon dioxide. Unexpected pressure build-up in the container are handled by venting the container into the autoclave enclosure. Venting directly to the thermolytic detoxifier with the inlet closed is another mode of operation. Final isolation and cooling may occur with the enclosure sealed and the interior filled with carbon dioxide.

In many instances, it will be desirable to utilize a plurality of autoclaves in connection with a single thermolytic detoxifier. While one autoclave is vaporizing the waste from a container therein, other autoclaves can be either in a warm-up mode or cooling down mode readying for cool drum removal.

In all cases of operation, the hot gas that is used to heat the container 17 in the autoclave provides for significant heat recovery and therefore energy savings. The gas used for this function, since it is effluent from the thermolytic detoxification reactor, is not contaminated and therefore does not contaminate the inside of the autoclave enclosure 11 nor does it contaminate the exterior of the container 17. Toxic waste enters the gas flow only after the gas passes through the interior of the container 17, after which it is conducted directly to the thermolytic detoxifier.

In a preferred form of operating the autoclave of the invention, the following conditions are utilized:
Operating conditions at high pressure flow:
1. Pressure = −22.8 cm of water (below 1 atmosphere)
2. Flow = 0.68 m$^3$/ minute
3. Hot gas in = 445° C.
4. Top of interior = 282° C.
5. Hot gas out = 222° C.
6. Oxygen level = 1%
7. Weigh scale = 162 Kg.
8. Liquid feed = 7.5 to 115 liters/hour It may be seen, therefore, that the invention provides an improved method and an improved autoclave for feeding gaseous toxic waste to a thermolytic detoxification reactor. Several autoclaves may be utilized together to provide for continuous feed to the reactor while changing drums and heating up and cooling down various drums. No additional heat source is required, since the autoclave is heated solely by waste heat recovered from the thermolytic detoxification reactor.

The manner and method in which the pumped liquid stream is distributed into the container (i.e. drum) within the autoclave is important in the maximization of ash production. For example, distributing, atomizing and spraying liquids within the container (i.e., drum) are effective.

Various modifications of the invention will be apparent to those skilled in the art from the foregoing description and accompanying drawings. Such modifications are intended to fall within the scope of the appended claims.

What is claimed is:

1. In a detoxification reactor system which includes a reactor for reacting gaseous toxic waste in a reaction chamber the improvement comprising, an autoclave for use as a feed source for said reaction chamber, said autoclave comprising, an enclosure for fully enclosing a toxic waste container, said enclosure being configured to maintain an inert and atmospherically isolated volume between an enclosed toxic waste container and the interior surface of said enclosure, enclosure inlet means for introducing a hot gaseous material substantially free of oxygen from said reaction chamber to said isolated volume defined by said enclosure outside said toxic waste container enclosed therein for heating the container, means for recirculating said gaseous material from said isolated volume to the interior of said toxic waste container in said enclosure, enclosure outlet means for conducting a gas substantially free of oxygen from the interior of the container in said enclosure to said reaction chamber for reaction therein, and means for purging oxygen from said enclosure and the container therein and for excluding oxygen therefrom during operation of said autoclave.

2. A system according to claim 1 including feed means for continuously replenishing the contents of the container.

3. A system according to claim 1 including weighing means for monitoring the weight of said container.

4. A system according to claim 1 including door means on said enclosure for enabling insertion and removal of the container.

5. A system according to claim 1 including means for monitoring the temperature of the interior of said enclosure.

6. A system according to claim 1 including means for monitoring the oxygen content of the interior of said enclosure.

7. A process for operating a detoxification reactor system which includes a reactor for reacting gaseous toxic waste in a reaction chamber wherein toxic waste is fed to the reaction chamber from a toxic waste container, said process comprising, fully enclosing said toxic waste container in an inert and atmospherically isolated volume substantially free of oxygen introducing hot gaseous material which is substantially free of oxygen from the reaction chamber to the isolated volume outside of the toxic waste container for heating the container, recirculating the gaseous material from the isolated volume to the interior of the container, conducting gas from the interior of the container to the reaction chamber for reaction therein, and purging oxygen from the isolated volume and the container therein and excluding oxygen therefrom during operation of said process.

8. A process according to claim 7 wherein said hot gaseous material introduced to said isolated volume comprises steam and carbon dioxide.

9. A process according to claim 8 wherein the temperature of said hot gaseous material introduced to said isolated volume is in the range from 300° C. to an 600°.

10. A process according to claim 7 where in the contents of the container are continuously replenished.

* * * * *